(12) United States Patent
Kim et al.

(10) Patent No.: US 10,141,553 B2
(45) Date of Patent: Nov. 27, 2018

(54) SECONDARY BATTERY AND BATTERY MODULE HAVING THE SAME

(71) Applicant: SK Innovation Co., Ltd., Seoul (KR)

(72) Inventors: Jin Go Kim, Daejeon (KR); Seung Noh Lee, Daejeon (KR); Yong Jun Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 245 days.

(21) Appl. No.: 15/136,385

(22) Filed: Apr. 22, 2016

(65) Prior Publication Data

US 2016/0315301 A1 Oct. 27, 2016

(30) Foreign Application Priority Data

Apr. 22, 2015 (KR) .................. 10-2015-0056691

(51) Int. Cl.
| | |
|---|---|
| *H01M 2/10* | (2006.01) |
| *H01M 10/04* | (2006.01) |
| *H01M 2/12* | (2006.01) |
| *H01M 2/02* | (2006.01) |
| *H01M 2/06* | (2006.01) |

(52) U.S. Cl.
CPC ....... *H01M 2/1241* (2013.01); *H01M 2/0207* (2013.01); *H01M 2/06* (2013.01)

(58) Field of Classification Search
CPC ..... H01M 2/1241; H01M 2/06; H01M 2/0207
See application file for complete search history.

(56) References Cited

U.S. PATENT DOCUMENTS

| | | | |
|---|---|---|---|
| 2011/0052951 A1* | 3/2011 | Yang | ............ H01M 2/1077 429/90 |
| 2014/0011060 A1* | 1/2014 | Yang | ............ H01M 2/08 429/82 |
| 2014/0199581 A1 | 7/2014 | Ryu et al. | |

FOREIGN PATENT DOCUMENTS

| | | |
|---|---|---|
| KR | 1020140091441 A | 7/2014 |
| KR | 1020140129600 A | 11/2014 |
| KR | 1020140141262 A | 12/2014 |

* cited by examiner

*Primary Examiner* — Lisa S Park
(74) *Attorney, Agent, or Firm* — The Webb Law Firm

(57) ABSTRACT

A secondary battery is provided. The secondary battery may include an electrode assembly; a pouch including a sealing portion along outer edges thereof and configured to accommodate and seal the electrode assembly; an electrode lead inserted through the sealing portion and connected to the electrode assembly, the electrode lead including a first vent hole opened toward the electrode assembly; and lead films disposed between the electrode lead and the sealing portion of the pouch, the lead films including second vent holes opened toward the electrode assembly. The second vent holes may overlap the first vent hole to form a path penetrating the lead films and the electrode lead.

13 Claims, 20 Drawing Sheets

SECONDARY BATTERY AND BATTERY MODULE HAVING THE SAME

CROSS-REFERENCE TO RELATED APPLICATION

This application claims priority to Korean Patent Application No. 10-2015-0056691 filed Apr. 22, 2015, the disclosure of which is hereby incorporated in its entirety by reference.

BACKGROUND

The present disclosure relates to a secondary battery and a battery module including the secondary battery.

Along with the size reduction of portable wireless devices such as video cameras, mobile phones, portable computers, and digital cameras, and the advance and high functionality trend in electric vehicles, secondary batteries generally used as power sources of such devices are required to have small sizes, high energy density, and superior charge-discharge characteristics.

Examples of secondary batteries include nickel-cadmium batteries, nickel metal hydride batteries, nickel-zinc batteries, and lithium secondary batteries. In particular, lithium secondary batteries have long lifespans and high energy densities. Lithium secondary batteries may be classified according to the types of electrolytes. For example, lithium metal batteries and lithium ion batteries use liquid electrolytes, and lithium polymer batteries use solid polymer electrolytes.

Although lithium secondary batteries have the above-mentioned merits, lithium secondary batteries may undergo abnormal situations such as internal short circuits, over-charging, and heating. In such situations, electrolytes of lithium secondary batteries may decompose and generate high-pressure gas, and thus the lithium secondary batteries may be deformed or decreased in lifespan.

In particular, if secondary batteries swell, the secondary batteries may explode or catch on fire, and thus measures for guaranteeing safety are required.

SUMMARY

An aspect of the present disclosure may provide a safe secondary battery.

Aspects of the present disclosure are not limited thereto, and other aspects or effects of the present disclosure will be apparently understood through the following description or may be learned by practice of the presented exemplary embodiments.

According to an aspect of the present disclosure, a secondary battery may include: an electrode assembly; a pouch including a sealing portion along outer edges thereof and configured to accommodate and seal the electrode assembly; an electrode lead inserted through the sealing portion and connected to the electrode assembly, the electrode lead including a first vent hole opened toward the electrode assembly; and lead films disposed between the electrode lead and the sealing portion of the pouch, the lead films including second vent holes opened toward the electrode assembly, wherein the second vent holes may overlap the first vent hole to form a path penetrating the lead films and the electrode lead.

The electrode lead may further include a folding groove in a center region in an extension direction thereof, the folding groove extending along the first vent hole.

The folding groove may be located at an exposed region of the electrode lead extending outwardly from the pouch.

The folding groove may be located at one or both sides of the electrode lead.

A portion of the electrode lead disposed inside the pouch may have partially cleaved structure incised along the first vent hole.

An end portion of the electrode lead may be connected to the electrode assembly, and another end portion of the electrode lead may extend outwardly from the pouch and may be exposed outside of the pouch, and the first vent hole may have a predetermined length and may extend from the end portion toward the other end portion of the electrode lead.

The first vent hole may extend from a center region in an extension direction of the electrode lead, and at least a portion of the first vent hole may be located at a region inside the sealing portion.

Portions of the lead films overlapping the sealing portion may have partially cleaved structure incised along the second vent holes.

End portions of the lead films may be exposed from the sealing portion to an inside of the pouch, and other end portions of the lead films may be exposed outside of the pouch, and the second vent holes may have a predetermined length and may extend from the end portions toward the other end portions of the lead films.

The second vent holes may overlap the first vent hole, and at least portions of the second vent holes may be located at a region inside the sealing portion.

The electrode lead may include a positive electrode and a negative electrode, and the first vent hole may be formed in at least one of the positive electrode and the negative electrode.

The lead films may be disposed between the pouch and the positive and negative electrodes, and the second vent holes may be formed at positions corresponding to the first vent hole.

The first and second vent holes may have at least one of a slit shape, a circular shape, a triangular shape, a quadrangular shape, and a combination thereof.

According to another aspect of the present disclosure, a battery module may include the secondary battery.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
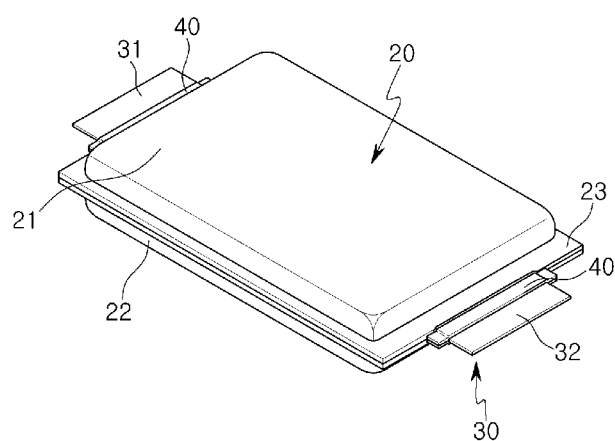
FIG. 1 is a perspective view schematically illustrating a secondary battery according to an exemplary embodiment of the present disclosure.

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

Figure 2:
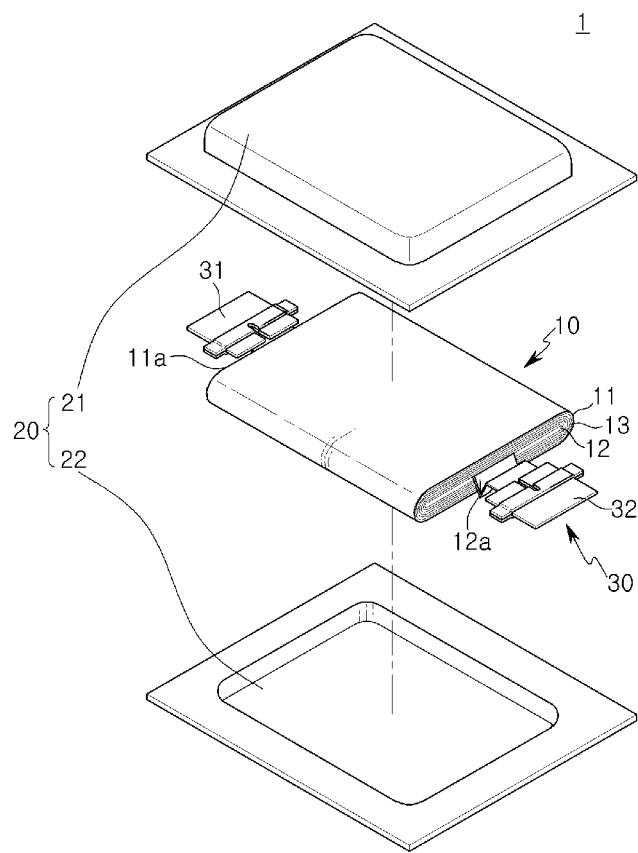
FIG. 2 is an exploded perspective view illustrating the secondary battery illustrated in FIG. 1.

A secondary battery 1 will now be described with reference to FIGS. 1 to 3 according to an exemplary embodiment of the present disclosure. FIG. 1 is a perspective view schematically illustrating the secondary battery 1 according to the exemplary embodiment of the present disclosure. FIG. 2 is an exploded perspective view illustrating the secondary battery 1 illustrated in FIG. 1, and FIG. 3 is a plan view illustrating the secondary battery 1 illustrated in FIG. 1.

Figure 3:
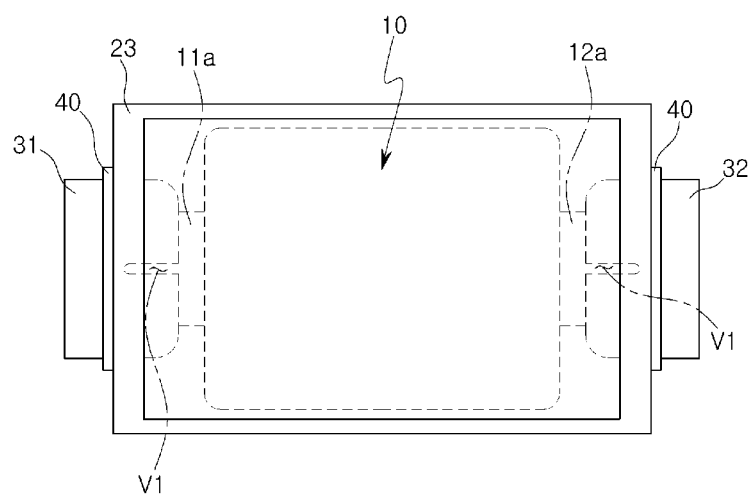
FIG. 3 is a plan view illustrating the secondary battery illustrated in FIG. 1.

Referring to FIGS. 1 to 3, according to an exemplary embodiment, the secondary battery 1 may include an electrode assembly 10, a pouch 20, electrode leads 30, and lead films 40.

The electrode assembly 10 may have a structure of positive electrode plate/separator/negative electrode plate which is formed by stacking at least one positive electrode plate 11 and at least one negative electrode plate 12 with a separator 13 being disposed therebetween. The positive electrode plate 11 and the negative electrode plate 12 may not be in contact with each other but may be separated from each other by the separator 13.

The positive electrode plate 11 may be formed by applying a positive electrode active material to a collector, and the negative electrode plate 12 may be formed by applying a negative electrode active material to a collector.

The electrode assembly 10 may have a stacked structure in which a plurality of positive electrode plates 11 and a plurality of negative electrode plates 12 are stacked, or may have a jelly-roll structure formed by winding the positive electrode plate 11 and the negative electrode plate 12.

The electrode assembly 10 may further include: a positive electrode tab 11a partially protruding from a portion of the positive electrode plate 11; and a negative electrode tab 12a partially protruding from a portion of the negative electrode plate 12. The positive electrode tab 11a and the negative electrode tab 12a may be portions of the positive electrode plate 11 and the negative electrode plate 12 not coated with the active materials. The positive electrode tab 11a and the negative electrode tab 12a may be connected to the electrode leads 30 (described later).

The pouch 20 may include a sealing portion 23 along edges thereof, and the electrode assembly 10 may be accommodated and sealed in the pouch 20. The pouch 20 may include a first pouch film 21 and a second pouch film 22, and the sealing portion 23 may be a region formed by bonding edge portions of the first and second pouch films 21 and 22 into a one-piece portion by a thermal fusing method. The electrode assembly 10 may be disposed in an inner space of the pouch 20 sealed by the sealing portion 23. Thus, the electrode assembly 10 may be isolated from an external environment. In addition, the inner space of the pouch 20 may be filled with an electrolyte.

The pouch 20 may have a multilayer structure laminated with an inner resin layer, a metal layer, and an outer resin layer. The resin layers may be formed of a resin such as polypropylene (PP), polyethylene terephthalate (PET), and the like. For example, the metal layer may be formed of aluminum (Al). However, the materials are examples that may be used to form the pouch 20. That is, materials that may be used to form the pouch 20 are not limited thereto.

The electrode leads 30 may be inserted through the sealing portion 23 and may be connected to the electrode assembly 10. The electrode leads 30 may include at least a pair of a positive electrode 31 and a negative electrode 32, and the positive electrode 31 and the negative electrode 32 may be connected to the positive electrode tab 11a and the negative electrode tab 12a of the electrode assembly 10, respectively.

In the present example embodiment, the positive electrode 31 and the negative electrode 32 are disposed on both sides of the pouch 20 and extend in opposite directions. However, the positive electrode 31 and the negative electrode 32 are not limited thereto. For example, although not shown in FIGS. 1 to 3, the positive electrode 31 and the negative electrode 32 may be disposed on one side of the pouch 20 and may extend in parallel with each other in the same direction.

Each of the electrode leads 30 may be formed of a thin metal plate having a quadrangular shape. End portions, or edges, of the electrode leads 30 may be connected to the electrode assembly 10, for example, to the positive electrode tab 11a and the negative electrode tab 12a of the electrode assembly 10. Other end portions of the electrode leads 30 may extend outwardly from the pouch 20 through the sealing portion 23 of the pouch 20.

The electrode leads 30 may include first vent holes V1 formed in the end portions thereof, and the first vent holes V1 may be opened in directions toward the electrode assembly 10. The first vent holes V1 may be formed in the positive electrode 31 and the negative electrode 32, respectively. Alternatively, a first vent hole V1 may be formed in one of the positive electrode 31 and the negative electrode 32. In particular, a portion of the electrode lead 30 disposed inside the pouch 20 has a notch extending into an outermost edge of the electrode lead 30 and toward the electrode assembly to form the first vent hole V1.

Figure 4A:
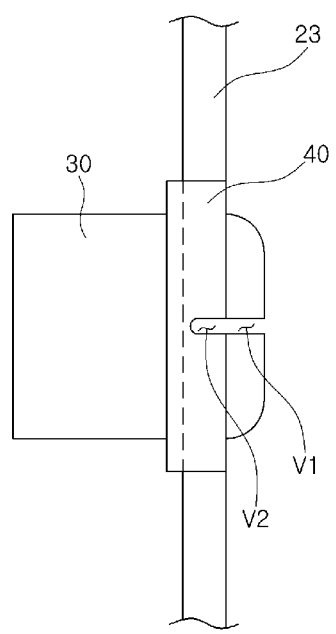
FIG. 4A is an enlarged view schematically illustrating an electrode lead and lead films.
Figure 4B:
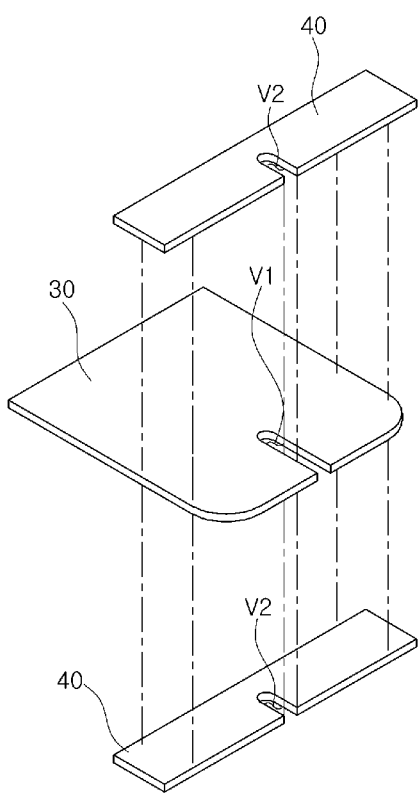
FIG. 4B is an exploded perspective view illustrating the electrode lead and the lead films illustrated in FIG. 4A.
Figure 5:
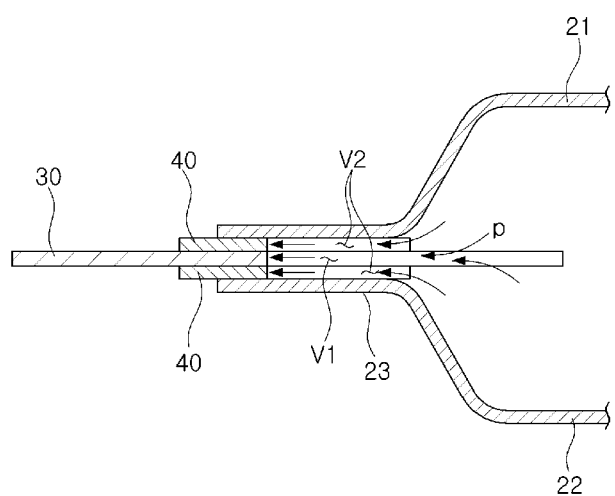
FIG. 5 is a cross-sectional view schematically illustrating the electrode lead and the lead films disposed inside a sealing portion of a pouch.

In detail, referring to FIGS. 4A, 4B, and 5, the first vent holes V1 may be shaped like a slit having a predetermined length and may extend from the edge of the end portion connected to the electrode assembly toward the other end portion of each electrode lead 30. The first vent holes V1 may be formed in center regions in extension directions of each electrode lead 30.

The first vent holes V1 may have a predetermined length and may extend from the end portions toward the other end portions of the electrode leads 30. At least the first vent holes V1 may not be formed in a region outside the sealing portion 23, and thus may not be exposed to the outside of the pouch 20. That is, ends of the first vent holes V1 may be located at least in a region inside the sealing portion 23.

Portions of the electrode lead 30 disposed inside the pouch 20 may have a notch in the form of a partially cleaved structure incised along each of the first vent holes V1.

In the present embodiment, only a single first vent hole V1 is formed in the center region of each of the electrode leads 30. However, this is a non-limiting example. For example, although not shown in FIGS. 4A, 4B, and 5, a plurality of first vent holes V1 may be formed in each of the electrode leads 30.

Inside the sealing portion 23, the lead films 40 may be disposed between the pouch 20 and the electrode leads 30, that is, between the pouch 20 and the positive and negative electrodes 31 and 32. The lead films 40 may be attached to the electrode leads 30 in such a manner that the lead films 40 surround the electrode leads 30 in a width direction of the electrode leads 30. The lead films 40 and the pouch 20 may be thermally fused to each other so as to enhance sealing between the pouch 20 and the electrode leads 30.

End portions of the lead films 40 extending from the sealing portion 23 may be exposed to the inside of the pouch 20, and other end portions of the lead films 40 may be exposed to the outside of the pouch 20. Second vent holes V2 may be formed at the end portions of the lead films 40, and the second vent holes V2 may be opened in directions toward the electrode assembly 10.

The second vent holes V2 may be shaped like a slit having a predetermined length and may extend from the end portions toward the other end portions of the lead films 40. At least, the second vent holes V2 may not be formed in a region outside the sealing portion 23, and thus may not be exposed to the outside of the pouch 20. That is, ends of the second vent holes V2 may be located at least in a region inside the sealing portion 23. The second vent holes V2 may extend from center regions of the lead films 40.

The second vent holes V2 may be formed at positions corresponding to positions at which the first vent holes V1 are formed. The second vent holes V2 may overlap the first vent holes V1 to form paths penetrating the lead films 40 and the electrode leads 30.

Portions of the lead films 40 that overlap the sealing portion 23 may have a notch in the form of a partially cleaved structure incised along each of the second vent holes V2.

In the present embodiment, the second vent holes V2 are respectively formed at center regions of the lead films 40. However, this is a non-limiting example. For example, although not shown in FIGS. 4A, 4B, and 5, at least one second vent hole V2 corresponding to the first vent hole V1 may be formed in each of the lead films 40.

For example, the second vent holes V2 of the lead films 40 and the first vent holes V1 of the electrode leads 30 may be formed by simultaneously punching the lead films 40 and the electrode leads 30 after attaching the lead films 40 to the electrode leads 30. That is, the first and second vent holes V1 and V2 may be overlapping holes formed at the same positions in the same shape.

As described above, according to the present example embodiment, since the electrode leads 30 and the lead films 40 surrounding the electrode leads 30 include the first vent holes V1 and the second vent holes V2 overlapping each other, gas generated in the pouch 20 may be rapidly discharged externally.

Figure 6:
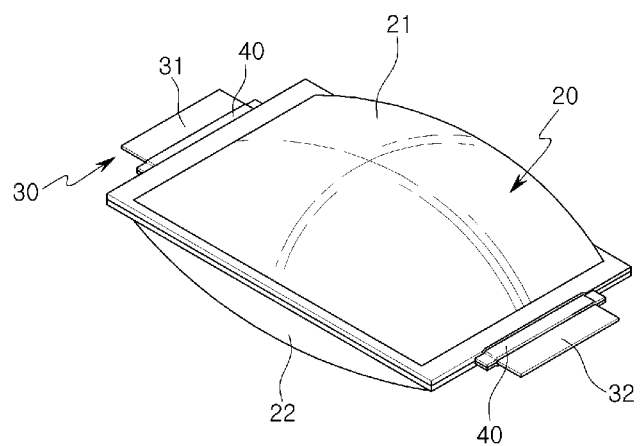
FIGS. 6 and 7 are perspective views schematically illustrating a process of discharging gas from the secondary battery.
Figure 7:
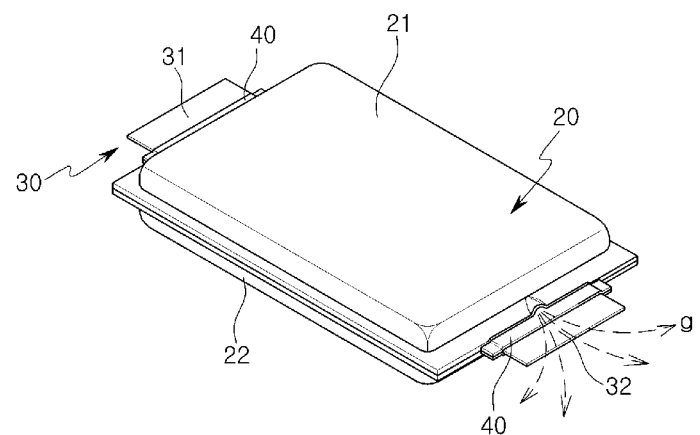

In detail, referring to FIGS. 5 to 7, the sealing portion 23 sealing the inside of the pouch 20 may have separated regions at positions corresponding to the first and second vent holes V1 and V2 because the first and second pouch films 21 and 22 are not thermally fused to each other in the separated regions. In this case, the sealing portion 23 may be narrower in the regions at which the first and second vent holes V1 and V2 are provided than in the other region of the sealing portion 23.

In particular, since the first and second vent holes V1 and V2 are opened at the end portions of the electrode leads 30 and the lead films 40 exposed to the inner space of the pouch 20, the inner space of the pouch 20 sealed with the sealing portion 23 may partially extend toward the inside of the sealing portion 23 owing to the first and second vent holes V1 and V2.

Therefore, if the pouch 20 swells because of gas generated in the pouch 20, pressure p may concentrate in the regions at which the first and second vent holes V1 and V2 are provided. Thus, bonding of the sealing portion 23 may first break in the regions at which the first and second vent holes V1 and V2 are provided but may be maintained in the other region. As a result, the sealing portion 23 may first be opened in the regions, and gas g may be discharged through the regions. Owing to this, even if the secondary battery 1 operates abnormally, accidents such as explosions may be prevented, and the secondary battery 1 may be used more safely and reliably.

In the example embodiment, it is illustrated that bonding of the sealing portion 23 breaks in a region at which the negative electrode 32 of the electrode leads 30 is disposed, and gas g is discharged through the region. However, this is a non-limiting example. For example, bonding of the sealing portion 23 may break in a region at which the positive electrode 31 is disposed, or bonding of the sealing portion 23 may break in regions at which the positive electrode 31 and the negative electrode 32 are disposed.

In the example embodiment, the first and second vent holes V1 and V2 have a slit shape. However, the first and second vent holes V1 and V2 are not limited thereto.

Figure 8A:
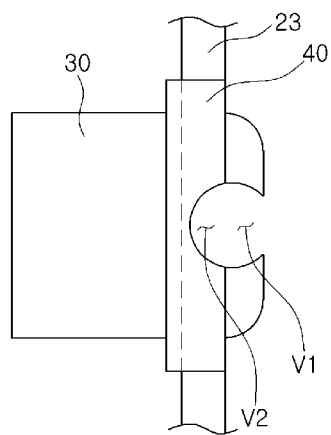
FIGS. 8A, 8B, 8C, 9A, 9B, and 9C are enlarged views schematically illustrating various modifications of first and second vent holes.
Figure 8B:
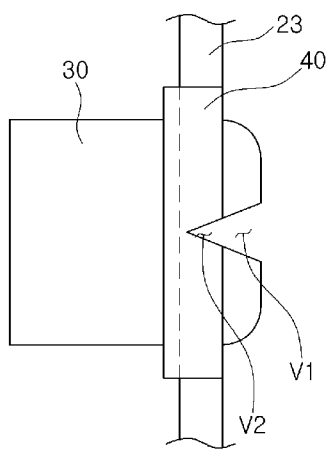
Figure 8C:
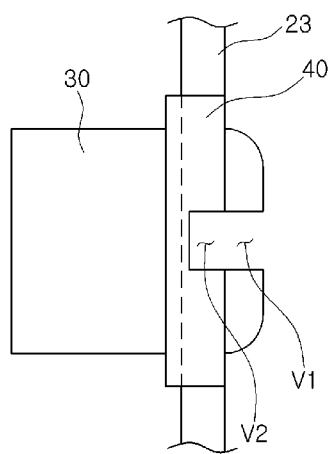

FIGS. 8A to 9C are views schematically illustrating modifications of the first and second vent holes V1 and V2. As illustrated in FIGS. 8A to 8C, the first and second vent holes V1 and V2 may have a circular shape, a triangular shape, a quadrangular shape, or the like.

Figure 9A:
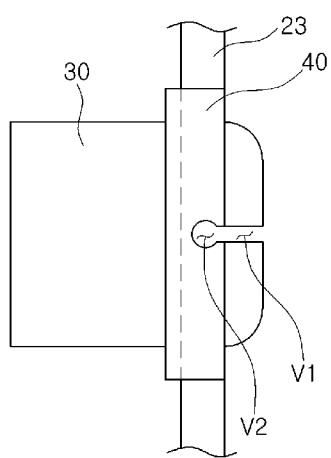
Figure 9B:
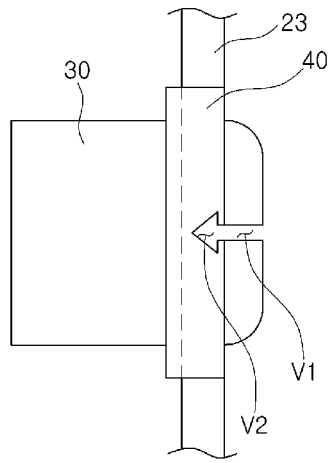
Figure 9C:
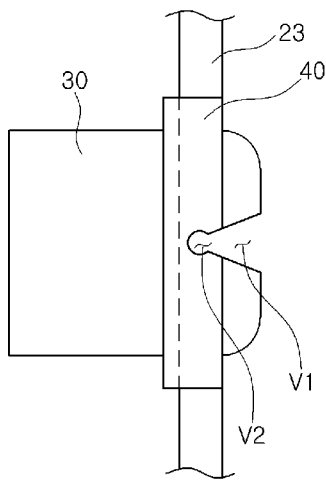

In addition, as illustrated in FIGS. 9A to 9C, the first and second vent holes V1 and V2 may have a combined shape including at least one of the listed shapes.

Figure 10:
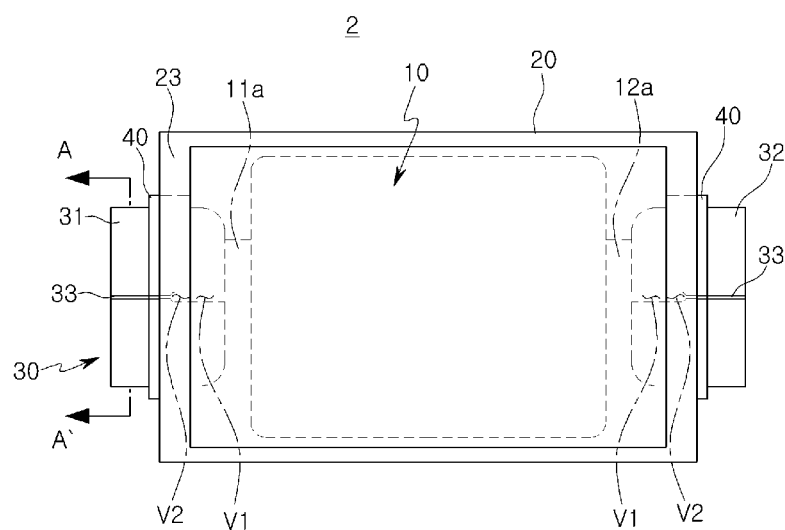
FIG. 10 is a plan view schematically illustrating a secondary battery according to another exemplary embodiment of the present disclosure.

A secondary battery 2 will now be described with reference to FIGS. 10 and 11 according to another example embodiment of the present disclosure. FIG. 10 is a plan view schematically illustrating the secondary battery 2 according to the other example embodiment of the present disclosure, and FIG. 11 is a cross-sectional view taken along ling A-A' of FIG. 10.

The secondary battery 2 of the present example embodiment illustrated in FIGS. 10 and 11 has substantially the same structure as the secondary battery 1 of the previous example embodiment illustrated with reference to FIGS. 1 to 9C. However, electrode leads 30 have a structure different from the structure of the electrode leads 30 of the previous example embodiment illustrated with reference to FIGS. 1 to 9C. Thus, descriptions of the same parts as those described in the previous example embodiment will be omitted, and the structure of the electrode leads 30 will now be mainly described.

Figure 11:
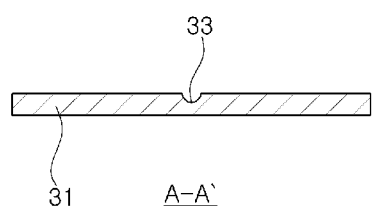
FIG. 11 is a cross-sectional view taken along line A-A' of FIG. 10.

Referring to FIGS. 10 to 11, the secondary battery 2 of the present example embodiment may include an electrode assembly 10, a pouch 20, electrode leads 30, and lead films 40.

The electrode assembly 10, the pouch 20, and the lead films 40 may have substantially the same structures as those of the electrode assembly 10, the pouch 20, and the lead films of the previous example embodiment illustrated with reference to FIGS. 1 to 9C. Thus, detailed descriptions thereof will be omitted.

The electrode leads 30 may be disposed in a sealing portion 23 and may be connected to the electrode assembly 10. The electrode leads 30 may include at least a pair of a positive electrode 31 and a negative electrode 32, and the positive electrode 31 and the negative electrode 32 may be respectively connected to a positive electrode tab 11a and a negative electrode tab 12a of the electrode assembly 10. As in the previous example embodiment illustrated in FIG. 1, the electrode leads 30 may include first vent holes V1 in center regions thereof.

Unlike in the previous example embodiment illustrated in FIGS. 1 to 9C, the electrode leads 30 may further include folding grooves 33 in the center regions in extension directions thereof, and the folding grooves 33 may extend along the first vent holes V1.

Figure 12:
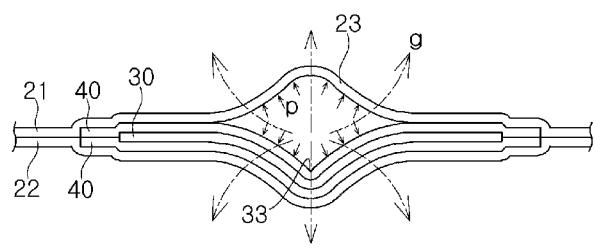
FIGS. 12 and 13 are a side view and a perspective view schematically illustrating a process of discharging gas from the secondary battery.
Figure 13:
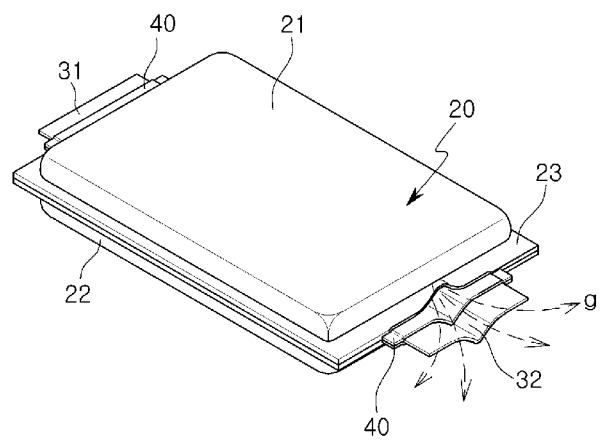

In detail, referring to FIGS. 12 and 13, if bonding of the sealing portion 23 breaks due to concentration of pressure p in regions in which the first vent holes V1 are located, the electrode leads 30 may be folded in a V-like shape along the folding grooves 33, and thus the pouch 20 may be rapidly opened. That is, if the pouch 20 swells, forces may be applied to the electrode leads 30 and the sealing portion 23 in opposite directions at the first vent holes V1 because of the internal pressure of the pouch 20, and thus the electrode leads 30 may be bent along the folding grooves 33 in a direction away from the sealing portion 23. Thus, bonding between the sealing portion 23 and the electrode leads 30 may be rapidly broken.

The folding grooves 33 may be formed at exposed regions of the electrode leads 30 that extend outwardly from the pouch 20. Each of the electrode leads 30 may have the folding groove 33 at one side thereof or folding grooves 33 at both sides thereof.

Figure 14:
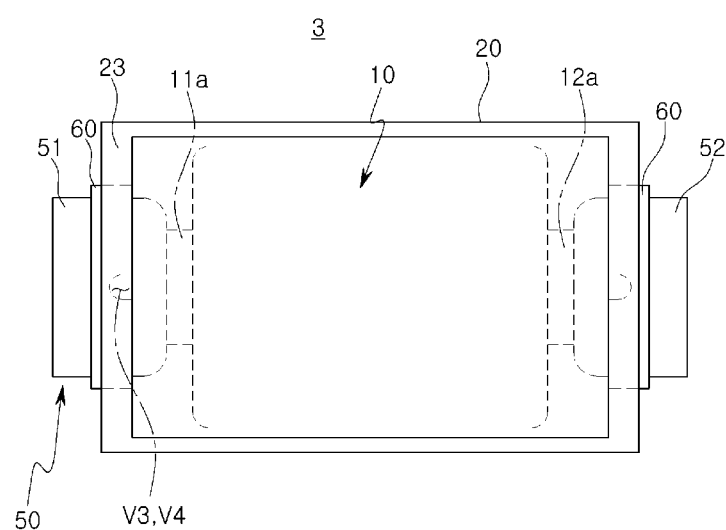
FIG. 14 is a plan view schematically illustrating a secondary battery according to another exemplary embodiment of the present disclosure.
Figure 15A:
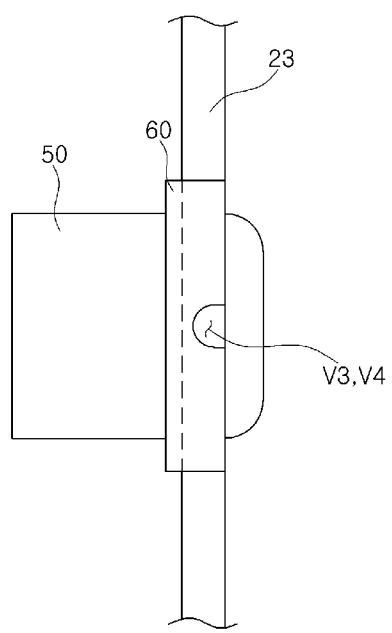
FIG. 15A is an enlarged view schematically illustrating an electrode lead and lead films.
Figure 15B:
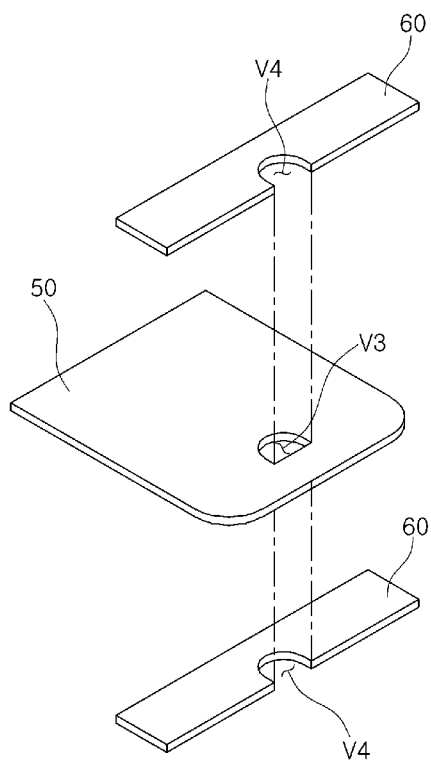
FIG. 15B is an exploded perspective view illustrating the electrode lead and the lead films illustrated in FIG. 15A.

A secondary battery 3 will now be described with reference to FIGS. 14 to 16 according to the other example embodiment of the present disclosure. FIG. 14 is a plan view schematically illustrating the secondary battery 3 according to the other example embodiment of the present disclosure; FIG. 15A is an enlarged view schematically illustrating an electrode lead 50 and lead films 60; FIG. 15B is an exploded perspective view illustrating the electrode lead 50 and the lead films 60 illustrated in FIG. 15A; and FIG. 16 is a cross-sectional view schematically illustrating the electrode lead 50 and the lead films 60 disposed in a sealing portion 23 of a pouch 20.

The secondary battery 3 of the present example embodiment illustrated with reference to FIGS. 14 to 16 may have substantially the same structure as the secondary battery 1 of the previous example embodiment illustrated with reference to FIGS. 1 to 9C. However, electrode leads 50 have a structure different from the structure of the electrode leads 30 of the previous example embodiment illustrated with reference to FIGS. 1 to 9C. Thus, descriptions of the same parts as those described in the previous example embodiment will be omitted, and the structure of the electrode leads 50 will now be mainly described.

Figure 16:
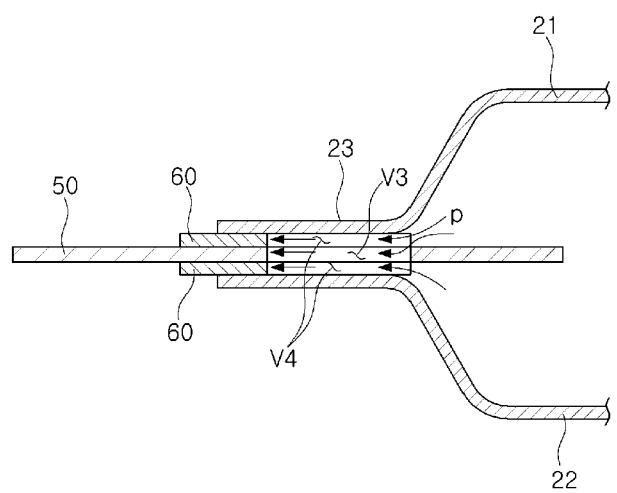
FIG. 16 is a cross-sectional view schematically illustrating the electrode lead and the lead films disposed in a sealing portion of a pouch.

Referring to FIGS. 14 to 16, the secondary battery 3 of the present example embodiment may include an electrode assembly 10, a pouch 20, electrode leads 50, and lead films 60.

The electrode assembly 10 and the pouch 20 may have substantially the same structures as the electrode assembly 10 and the pouch 20 of the previous example embodiment illustrated with reference to FIGS. 1 to 9C. Thus, detailed descriptions thereof will be omitted.

In the sealing portion 23, the lead films 60 may be disposed between the pouch 20 and the electrode leads 50. The lead films 60 may be attached to the electrode leads 50 in such a manner that the lead films 60 surround the electrode leads 50 in a width direction of the electrode leads 50. The lead films 60 and the pouch 20 may be thermally fused to each other to fix the electrode leads 50.

End portions of the lead films 60 extending from the sealing portion 23 may be exposed to the inside of the pouch 20, and other end portions of the lead films 60 may be exposed to the outside of the pouch 20. Second vent holes V4 may be formed at the end portions of the lead films 60, and the second vent holes V4 may be opened in directions toward the electrode assembly 10.

The second vent holes V4 may be shaped like a slit having a predetermined length and may extend from the end portions toward the other end portions of the lead films 60. At least, the second vent holes V4 may not be formed at a region outside the sealing portion 23, and thus may not be exposed to the outside of the pouch 20. That is, ends of the second vent holes V4 may be located at least in a region inside the sealing portion 23. The second vent holes V4 may be formed at center regions of the lead films 60.

Portions of the lead films 60 that overlap the sealing portion 23 may have partially cleaved structure incised along the second vent holes V4.

The electrode leads 50 may be inserted through the sealing portion 23 of the pouch 20 and may be connected to the electrode assembly 10. The electrode leads 50 may include at least a pair of a positive electrode 51 and a negative electrode 52, and the positive electrode 51 and the negative electrode 52 may be respectively connected to a positive electrode tab 11a and a negative electrode tab 12a of the electrode assembly 10.

First vent holes V3 may be formed through the electrode leads 50 at positions corresponding to the second vent holes V4 of the lead films 60. The first vent holes V3 may be respectively formed in the positive electrode 51 and the negative electrode 52, or a first vent hole V3 may be formed in one of the positive electrode 51 and the negative electrode 52.

The first vent holes V3 may have the same shape as the shape of the second vent holes V4, and may be formed through the electrode leads 50 in an overlapping relationship with the second vent holes V4. Similarly, ends of the first vent holes V3 may be located at a region inside the sealing portion 23.

In the previous example embodiment illustrated with reference to FIGS. 1 to 9C, the first vent holes V1 have a slit structure formed by partially cutting end portions of the electrode leads 30. In the present example embodiment, however, the first vent holes V3 are penetration holes formed through the electrode leads 50 and overlapping the second vent holes V4. That is, end portions of the electrode leads 50 may not be cut but may be closed.

As described above, the electrode leads 50 and the lead films 60 disposed in the sealing portion 23 include the first and second vent holes V3 and V4, respectively, and the first and second vent holes V3 and V4 are formed through the electrode leads 50 and the lead films 60. Thus, the sealing portion 23 may not be thermally fused and bonded at positions at which the first and second vent holes V3 and V4 are formed. Since the sealing portion 23 is not bonded at regions corresponding to the first and second vent holes V3 and V4, the sealing portion 23 may be narrower in the regions than in the other region.

Therefore, if the inner pressure of the pouch 20 increases because of gas generated in the pouch 20, expansion stress may concentrate in regions around the first and second vent holes V3 and V4, and thus bonding of the sealing portion 23 may be rapidly broken in the regions. Therefore, the sealing portion 23 may be rapidly opened in the regions.

Figure 17:
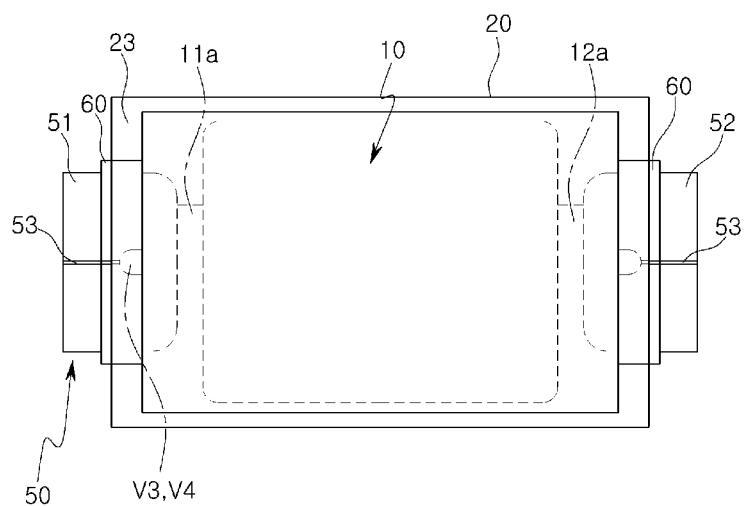
FIG. 17 is a plan view schematically illustrating a modification of the secondary battery illustrated in FIG. 14.

Mean while, referring to FIG. 17, as with the electrode leads 30 of the previous example embodiment illustrated in FIG. 10, the electrode leads 50 may further include folding grooves 53 formed at center regions in extension directions thereof and extending from the first vent holes V3.

Figure 18:
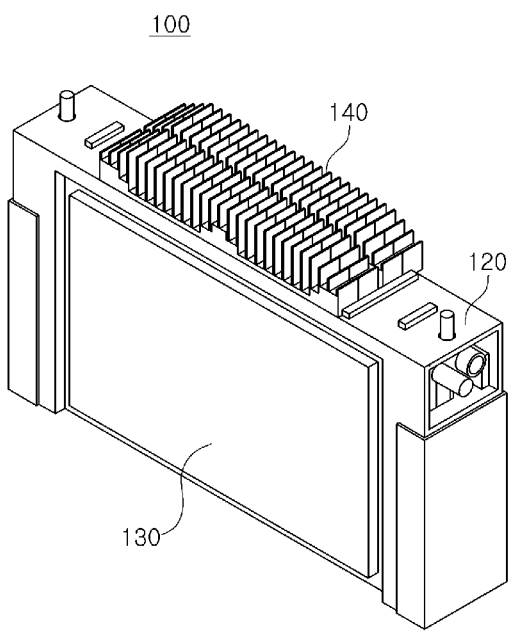
FIG. 18 is a perspective view schematically illustrating a battery module according to an exemplary embodiment of the present disclosure.

A battery module 100 will now be described with reference to FIGS. 18 and 19 according to an example embodiment of the present disclosure. FIG. 18 is a perspective view schematically illustrating the battery module 100 according to the example embodiment of the present disclosure, and FIG. 19 is an exploded perspective view schematically illustrating a battery cell 110 of the battery module 100 illustrated in FIG. 18.

Figure 19:
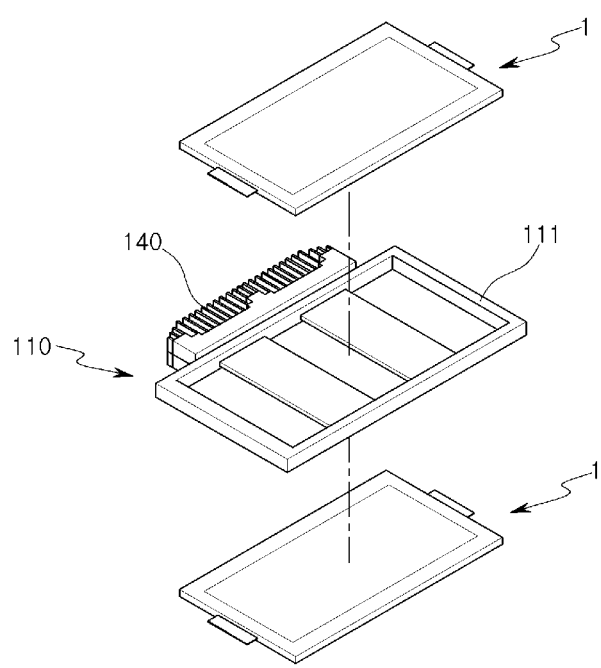
FIG. 19 is an exploded perspective view schematically illustrating a battery cell of the battery module illustrated in FIG. 18.

Referring to FIGS. 18 and 19, according to the example embodiment, the battery module 100 may include: battery cells 110 including secondary batteries 1 such as those described in the previous example embodiments; a case 120 accommodating the battery cells 110; and covers 130 covering the case 120.

Each of the battery cells 110 may include a partition 111 and one or more secondary batteries 1 supported by the partition 111 and fixed to the partition 111.

The partition 111 may have a quadrangular frame structure corresponding to the secondary batteries 1. The secondary batteries 1 may be disposed on one side or left and right sides of the partition 111.

The battery cells 110 may be arranged in the case 120 in a stacked manner and fixed therein. The covers 130 may be coupled to both lateral sides of the case 120 so as to cover the battery cells 110 arranged in the case 120 and isolate the battery cells 110 from the outside.

In addition, the battery module 100 may further include a heat sink 140 disposed on the case 120.

The battery module 100 may be used for transportation means using electricity as an energy source such as in electric vehicles, electric trains, electric planes, and the like. In addition, the battery module 100 may be used in various electronic devices operating using electricity.

Since the battery module 100 includes the secondary batteries 1, problems related to safety may be prevented even though the battery module 100 operates abnormally.

As set forth above, example embodiments of the present disclosure may provide a safe secondary battery and a battery module including the secondary battery. When the secondary battery swells, high-pressure gas generated in the secondary battery may be rapidly discharged through a particular portion, and thus the secondary battery may be safely used.

Aspects and effects of the present disclosure are not limited thereto, and may be apparently understood through the descriptions of the example embodiments of the present disclosure.

While example embodiments have been shown and described above, it will be apparent to those skilled in the art that modifications and variations could be made without departing from the scope of the present invention as defined by the appended claims.

What is claimed is:

1. A secondary battery comprising: an electrode assembly; a pouch comprising a sealing portion along outer edges thereof and configured to accommodate and seal the electrode assembly; electrode leads inserted through the sealing portion and connected to the electrode assembly, the electrode leads including one or more electrode leads having a first vent hole opened toward the electrode assembly; and lead films disposed between the one or more electrode leads having the first vent hole and the sealing portion of the pouch, the lead films comprising second vent holes opened toward the electrode assembly, wherein a portion of the one or more electrode leads having the first vent hole disposed inside the pouch has a notch extending into an outermost edge of the one or more electrode leads having the first vent hole and toward the electrode assembly to form the first vent hole, and wherein the second vent holes overlap the first vent hole to form a path penetrating the lead films and the electrode leads.

2. The secondary battery of claim 1, wherein the electrode leads further include a folding groove in a center region in an extension direction thereof, respectively, the folding groove extending along the first vent hole towards the electrode assembly.

3. The secondary battery of claim 2, wherein the folding groove is located at an exposed region of the electrode leads extending outwardly from the pouch.

4. The secondary battery of claim 2, wherein the folding groove is located at one of an upper and lower surface of the electrode leads or at both upper and lower surfaces of the electrode leads.

5. The secondary battery of claim 1, wherein an end portion of the electrode leads are connected to the electrode assembly, and another end portion of the electrode leads extend outwardly from the pouch and is exposed outside of the pouch, and
the first vent hole has a predetermined length and extends from the edge of the end portion connected to the electrode assembly toward the other end portion of the electrode leads.

6. The secondary battery of claim 5, wherein the first vent hole extends along a center region in an extension direction of the electrode leads, and at least a portion of the first vent hole is located at a region inside the sealing portion.

7. The secondary battery of claim 1, wherein portions of the lead films overlapping the sealing portion have notches forming the second vent holes.

8. The secondary battery of claim 1, wherein end portions of the lead films are exposed from the sealing portion to an inside of the pouch, and other end portions of the lead films are exposed outside of the pouch, and
the second vent holes have a predetermined length and extend from an edge of the end portions toward the other end portions of the lead films.

9. The secondary battery of claim 8, wherein the second vent holes overlap the first vent hole, and at least portions of the second vent holes are located at a region inside the sealing portion.

10. The secondary battery of claim 1, wherein the electrode leads include a positive electrode lead and a negative electrode lead, and one or more electrode leads having the first vent hole is at least one of the positive electrode lead and the negative electrode lead.

11. The secondary battery of claim 10, wherein the lead films are disposed between the pouch and the positive and negative electrode leads, and
the second vent holes are formed at positions corresponding to the first vent hole.

12. The secondary battery of claim 1, wherein the first and second vent holes have at least one of a slit shape, a circular shape, a triangular shape, a quadrangular shape, and a combination thereof.

13. A battery module comprising the secondary battery of claim 1.

* * * * *